United States Patent Office 3,606,136
Patented Sept. 20, 1971

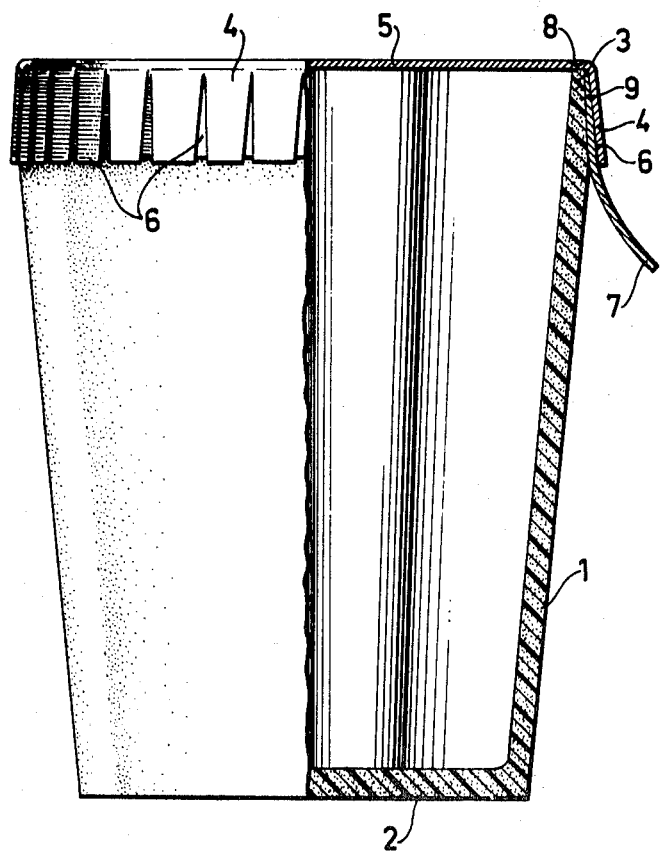

3,606,136
CONTAINERS MADE FROM A FOAM PLASTIC MATERIAL
Christian Hegardt, Skivarp, Sweden, assignor to AB Tetra Pak, Lund, Sweden
Filed June 13, 1969, Ser. No. 833,062
Claims priority, application Sweden, June 27, 1968, 8,710/68
Int. Cl. B65d 41/44
U.S. Cl. 229—43                                   8 Claims

ABSTRACT OF THE DISCLOSURE

A container comprises a container body made of foam plastic material and a cover for the same made from metal foil and which is turned down over the top edge of the container body and pleated. A leak-proof joint is established between the cover and container body by causing the foam plastic to swell to such an extent that the pleats along the folded-down edge portion of the cover are filled with foam plastic.

---

This invention refers to a container made from a foam plastic material, comprising a container body, a bottom portion and a cover portion of metal foil covering the opening of the container body, and to a method of producing such a container.

Packaging containers of foam plastic, which material exhibits great advantages, have often been used lately in packaging technology. Foam plastic material is e.g. very inexpensive, very light and very easy to form. It has furthermore very good thermal insulation properties and can easily be provided with an inner or outer skin of e.g. a homogeneous plastic material in order to improve its permeability characteristics. The most usual way of closing off foam plastic containers of the above kind is to fit a cover of thin sheet metal or metal foil over the opening of the container and to fold or seam down the edge of the cover around the opening. Since foam plastic containers often have a conical shape for technical reasons in manufacture, the cover applied in this way will be locked in its position over the container opening by means of the edge portions of the cover which are folded in against the conical side of the container. Such folding down of the edge zone of a roundel of metal foil naturally means that the said edge portion must be pleated, which in turn means that it is difficult to avoid the formation of channels communicating with the inside of the container, which entails leakage if the contents of the container are liquid. Attempts have been made to seal such a container closure by means of providing the cover with a coating that is capable of being heat sealed, e.g. a varnish capable of being heat sealed or a layer of thermoplastic material, and to heat seal the cover to the upper edge of the container opening. Apart from the fact that it has proved difficult to obtain a uniform seal around the whole of the container opening, this seal has the drawback that adhesion between the coating of the cover portion and the foam plastic material becomes so great that pieces of the foam plastic material are also torn off when the cover portion is pulled off.

The above inconveniences are avoided by constructing the container in accordance with the invention, which is characterised by the edge portion of the cover portion being folded down, whilst being pleated, so as to bear against the outside of the container body in the vicinity of its opening, and by the cover portion and the container body being united with one another so as to form a leak-proof joint, through the foam plastic material being caused to swell to such an extent that the pleats along the folded-down edge portion of the cover portion are filled with foam plastic. The invention also refers to a method of producing a container of the above kind, which method is characterised by a roundel of thin sheet metal or metal foil, provided with a coating that is capable of being heat sealed, being placed over the opening of the foam plastic container; by the edge portion of the said roundel being folded down, whilst being pleated, against the outside of the container opening; and by heat being thereafter supplied to that part of the cover portion which is folded down against the container body, whereby the foam plastic material in the heated portion of the container is caused to swell and to fill the pleats in the cover portion which were formed when its edge zone was folded down, and the coating and the cover portion, which is capable of being heat sealed, is caused to be joined to the surface layer of the foam plastic container so as to form a leak-proof and durable seal.

One constructional version of the invention will be described below by reference to the attached drawing, which shows a container in accordance with the invention, in which drawing the container body is denoted 1, the bottom of the container 2 and the edge zone of the container body 3. The cover portion is denoted 5 and the folded-down part or skirt of the cover portion 4. The pleats formed during folding down of the edge portion 4 of the cover portion 5 are denoted 6 and the pull tab of the cover portion 7.

The container shown in the constructional example thus consists of a conical foam plastic beaker 1 of e.g. polystyrene, which has been moulded in one piece, which is provided with a cover 5 that consists of an aluminium roundel 5 coated with a varnish capable of being heat sealed, the edge 4 of which is folded down, whilst being pleated, against the edge zone 3 of the foam plastic beaker 1. The pleats 6 at the edge portion 4 of the cover portion are completely filled by foam plastic material, which means that there are no leakage channels between the inside of the container and the surroundings. The folded-down edge portion 4 of the cover portion 5 is furthermore provided in the constructional example shown with a pull tab 7 that is not sealed to the container 1, by means of which the cover portion 5 can be removed, through the pull tab 7 being gripped between thumb and finger, and the edge zone portion 4 being torn off by moving the pull tab around the container opening. In order to further facilitate removal of the cover 5, this may be provided with a groove 8 or similar tear line next to the edge portion 3 of the container 1, in order to guide the path of the tear.

Instead of fitting a special pull tab 7, it is naturally possible to omit sealing the edge zone of the folded-down cover portion 4 to the container 1, in order to provide thereby a collar running around the container, which is not sealed, and which can act as a lift tab.

The cover portion 5 is applied to the container portion 1 in such a way that a roundel of metal foil provided with a layer that is capable of being heat sealed, is fitted over the filled container 1, after which the projecting edge portions 4 of the roundel of metal foil are folded or seamed in against the outside of the opening of the container 1, while the said portions of the roundel of metal foil are being pleated.

After the projecting portions 4 of the roundel of metal foil have been folded in against the container body 1, the folded-in zone 4 is heated to a temperature exceeding the sealing temperature of the layer which is capable of being heat sealed and exceeding the foaming temperature of the foam plastic material. The foam plastic material in the heated area is hereby caused to swell and to fill the pleats 6 which were formed when the edge portion 4 of the cover portion 5 was folded in. The foam plastic material is at the same time sealed to the coating on the inside of the cover portion which has been heated to its sealing temperature, so that a leakproof and durable seal is obtained.

Heating of the folded-down edge zone 4 may be accomplished either by radiant heat or by pressing a sealing tool, which is capable of being heated up, against the area to be sealed. It is naturally also possible to use hot air, high-frequency electricity or other means of heating, in order to bring about the required heating of the foam plastic material in the opening area of the container portions 1 and of the coating of the cover portion 5 that is capable of being heat sealed.

In order to facilitate folding down of the edge portion 4 of the cover portion 5 and the supply of heat to the said folded-down edge portion, it is best to bevel the outside of the container 1 next to the opening in such a way that the said bevelled portion forms a cylindrical surface, or in fact part of the envelope surface of a cone that becomes narrower towards the top. By virtue of the fact that the opening portion of the container 1 is given such a bevelled shape, it is possible to fold down the edge portion 4 of the cover portion 5 towards the container body 1 and to seal it to the container body by means of a tool capable of acting from above, which can be placed over the opening of the container 1, which tool exhibits a means of supplying heat to the edge zone 4 at the same time as the said edge portion is pressed in by the tool against the bevelled part 9 of the container body 1.

It has been found that a container in accordance with the invention becomes highly leakproof and even gastight if the inside of the container is provided with an impermeable skin of plastic that is capable of being heat sealed, and the container has in addition the advantage that it is easy to open without pieces of the upper edge of the container 1 being torn off, and at the same time the fact that the cover portion is torn off by a circular movement, makes this easier to tear off than if it had to be pulled off the container opening.

Even if the constructional version of the invention described above has been found very advantagous, it is naturally possible, within the framework of the invention, to envisage containers of a shape different from the conical container shown here. It is naturally not absolutely necessary either, that the cover portion should be provided with a coating that is capable of being heat sealed, and satisfactory leakproofness can be obtained even with an uncoated metal foil cover. It must however be pointed out that such an uncoated metal foil has slight mechanical strength, and therefore the leakproofness which has been obtained by the fact that the foam plastic material fills up the pleats in the folded-down edge of the cover, is easily lost as a result of carelessness in the transport or handling of the containers which have been fitted with a cover.

I claim:

1. A container comprising a hollow body of foamed plastic material, having an opening therein, a cover for said opening, said cover being provided with a pleated skirt surrounding the outer wall of said container adjacent said opening and bearing against the outer wall of the container, that portion of the foamed plastic material of the hollow body facing the pleated skirt filling, peripherally of the body, at least a portion of the inside of the pleats of said skirt so as to effectively seal the container.

2. A container as claimed in claim 1 and further comprising a heat sealable material between the periphery of said opening and the cover therefor.

3. A container as claimed in claim 2 wherein the heat sealable material is a heat sealable varnish.

4. A container as claimed in claim 1 wherein the outer wall of said container surrounded by said pleated skirt of said cover is cylindrical.

5. A container as claimed in claim 1 wherein the outer wall of said container surrounded by said pleated skirt of said cover is conical and converges toward the opening of the container.

6. A container as claimed in claim 1 and further comprising a pull tab disposed beneath the edge of the skirt capable of releasing the cover from the container when pulled up.

7. A container as claimed in claim 1 wherein the outer edge portion of the pleated skirt surrounding the outer wall of the container is free of expanded foamed plastic material whereby said outer edge portion may serve as a lift tab for releasing the cover.

8. A container as claimed in claim 1 wherein the cover is provided with a groove about the circumference thereof adjacent the opening of said container to facilitate removal of the cover by bearing along said groove.

References Cited

UNITED STATES PATENTS

| 2,361,507 | 10/1944 | Sonnenberg | 215—38B |
| 2,837,263 | 6/1958 | Nasello | 229—43 |
| 3,013,306 | 12/1961 | Richie et al. | 229—1.5BUX |
| 3,434,651 | 3/1969 | Stec | 229—5.5X |

DONALD F. NORTON, Primary Examiner

U.S. Cl. X.R.

215—1C, 39; 229—1.5B, 5.5